(No Model.)
G. W. ZEIGLER.
CLAMPING PLATE FOR TIMBER STRUCTURES.
No. 409,548. Patented Aug. 20, 1889.
Fig. 1.
Fig. 2.
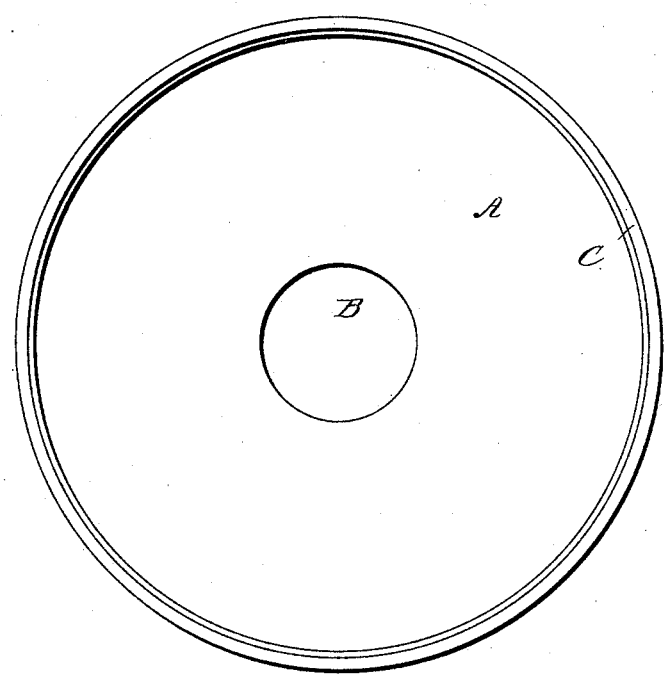
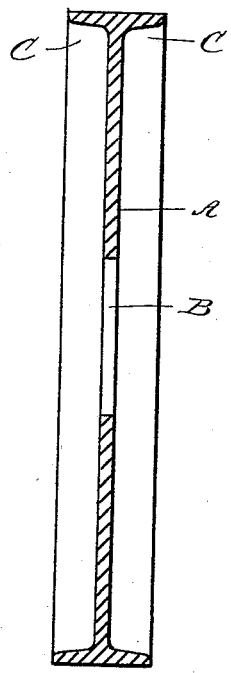
WITNESSES:
INVENTOR
George W. Zeigler
BY
ATTORNEY

UNITED STATES PATENT OFFICE.

GEORGE W. ZEIGLER, OF PHILADELPHIA, PENNSYLVANIA.

CLAMPING-PLATE FOR TIMBER STRUCTURES.

SPECIFICATION forming part of Letters Patent No. 409,548, dated August 20, 1889.

Application filed May 13, 1889. Serial No. 310,608. (No model.)

*To all whom it may concern:*

Be it known that I, GEORGE W. ZEIGLER, a citizen of the United States, residing at Philadelphia, in the county of Philadelphia and State of Pennsylvania, have invented certain new and useful Improvements in Washers for Folding Timber Structures; and I do hereby declare the following to be a sufficiently full, clear, and exact description thereof as to enable others skilled in the art to make and use the said invention.

This invention relates to trestles, scaffolding, bridges, and other braced structures of timber, and has for its object the furnishing of a cheap and efficient means of transmitting shearing strains from one member to another without producing any side strain upon the screw-bolts and nuts uniting the parts, and at the same time taking such hold upon the timber as to strengthen it against splitting.

To effect these desiderata, this invention consists in a washer having a central aperture through which a screw-bolt may pass freely and a rim upon each side which, by fitting into an annular groove in the wooden parts of a structure concentric with the bolt uniting such parts, prevents any lengthwise or sliding motion, and when the bolt and nut are slackened permits angular adjustment about the bolt as a pivot, but when the nut and bolt are tightened acts as a clamp, restraining the parts from moving upon each other.

The construction of this invention is illustrated in the accompanying drawings, in which—

Figure 1 shows a plan of the invention, and Fig. 2 a central section thereof.

A is a flat circular washer, of metal, having a central hole B therein of sufficient diameter to let the shaft of the screw-bolt, intended to be used with it, pass through it freely.

C C are annular rims formed integrally with the washer A, projecting upon both sides of the washer. The best proportions for the depth of these rims vary with the kind of lumber on which they are to be used. For pine and spruce on washers of three inches diameter rims of three-sixteenths of an inch have proved serviceable; but the proportions may be varied. These washers may be made by casting or by stamping from ductile metal. The latter, being lighter for the same strength, are preferable; but the appliances for making them are more expensive, especially in large sizes.

To use this invention, to unite one piece of timber to another the bolt-holes are bored in the desired position in both pieces of timber, and then with a scoring-bit a circular groove is cut concentric with the bolt-holes in the faces of the timbers to be opposed to each other, equal in diameter and depth to the rim C C of the washer A. The washer A is then placed between the timbers concentrically with the bolt-holes. The bolt and nut are then applied, with suitable washers of any of the ordinary constructions adapted to distribute the pressure over the breadth of the timber, and upon tightening the nut the parts are clamped securely to each other, and any lateral or lengthwise strain upon the timbers is resisted by the washer engaging in the grooves without any other strain upon the bolt than a tensile one in the direction of its axis.

Having described my invention and the mode of using the same, what I claim is—

A new article of manufacture, consisting of a flat washer provided with annular rims adapted to be fitted between pieces of timber to avoid side strain upon bolts, clamping together, and permitting pivotal motion without lengthwise or lateral movement, substantially as set forth.

GEORGE W. ZEIGLER.

Witnesses:
J. DANIEL EBY,
VAN WYCK BUDD.